Figure 1:
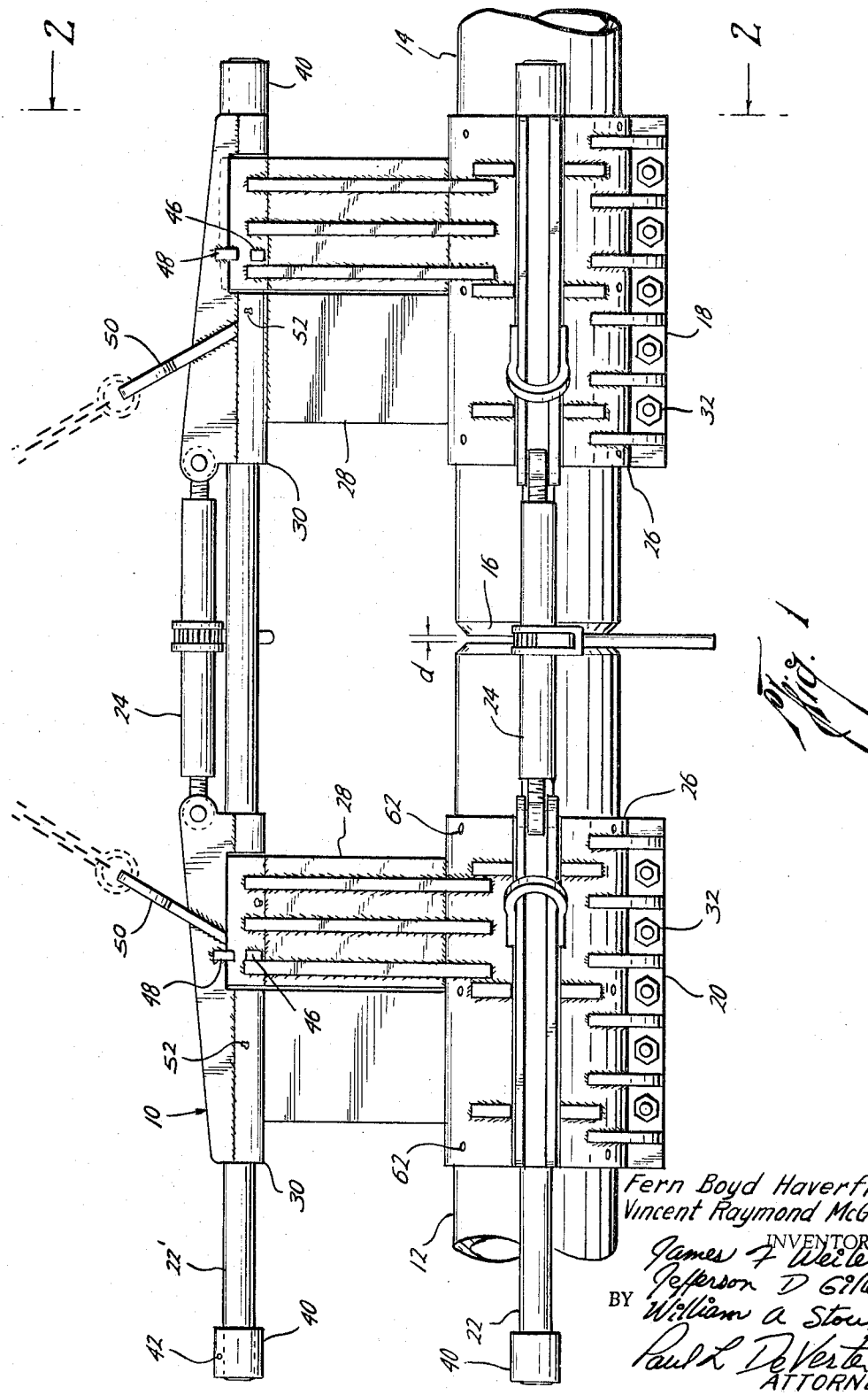

Nov. 15, 1966    F. B. HAVERFIELD ETAL    3,284,883
LINE UP CLAMP

Filed June 8, 1964    2 Sheets-Sheet 1

Fern Boyd Haverfield
Vincent Raymond McGehee
INVENTORS
James F Weiler
Jefferson D Giller
BY William A Stout
Paul L DeVerter II
ATTORNEYS Nov. 15, 1966  F. B. HAVERFIELD ETAL  3,284,883
LINE UP CLAMP
Filed June 8, 1964  2 Sheets-Sheet 2
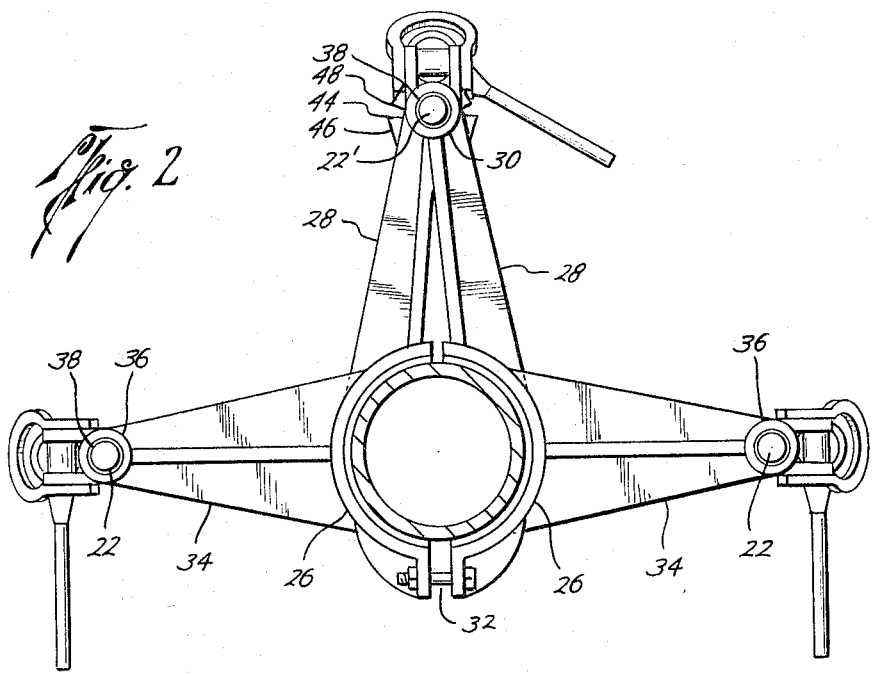
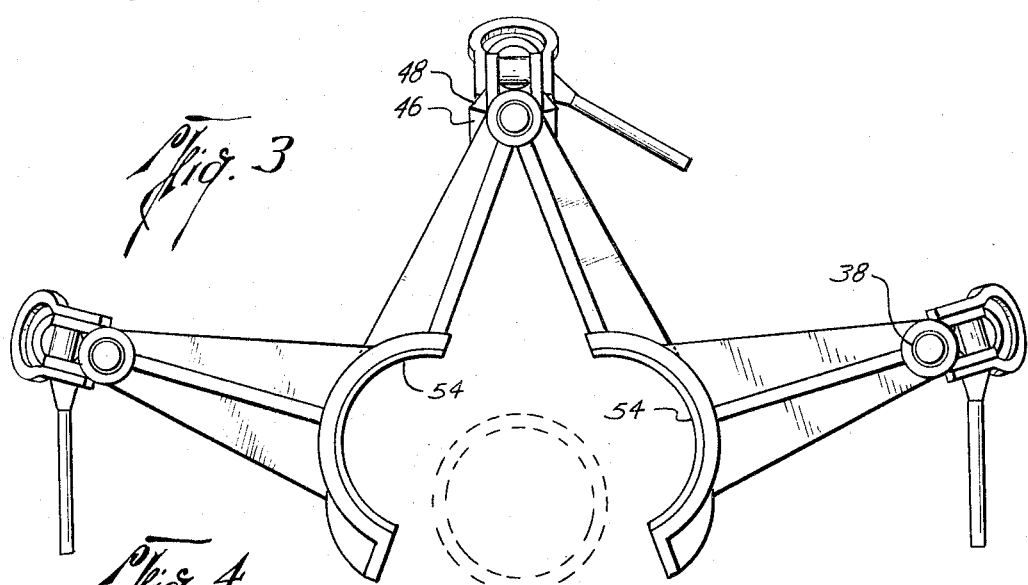
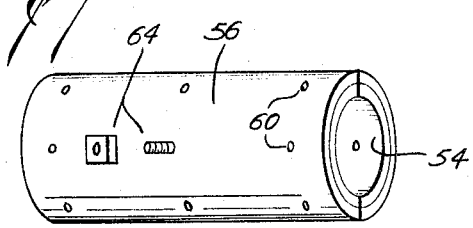
Fern Boyd Haverfield
Vincent Raymond McGehee
INVENTORS
James F. Weiler
BY Jefferson D. Giller
William A. Stout
Paul R. DeVerter II
ATTORNEYS

United States Patent Office 3,284,883
Patented Nov. 15, 1966

3,284,883
LINE UP CLAMP
Fern Boyd Haverfield and Vincent Raymond McGehee, both of P.O. Box 1396, Houston, Tex.
Filed June 8, 1964, Ser. No. 373,204
4 Claims. (Cl. 29—200)

The present invention relates to a line up clamp, and more particularly relates to a clamp which is extremely useful in adjusting and holding large diameter pipe ends in position for welding when the pipe is subject to movement or displacement, as on offshore locations.

When it is desired to weld two sections of large diameter pipeline together, it is necessary that the pipes be held apart approximately $\frac{1}{16}$–$\frac{1}{8}$ of an inch, and be held immobile relative to each other so that a "Stringer bead" made of weld metal may be run about the butted pipes. After the stringer bead is implaced, then subsequent layers of weld metal are built up until the joint is completed in a conventional manner. If one pipe is moved relative to the other before the stringer bead is relatively complete, then the joint must be cut, and the pipes rebeveled for another attempt. Otherwise, the required strength will not be attained in the pipe joint.

It is well known in the pipeline construction industry to utilize pipeline clamps to hold sections of pipe in position for welding. One of the more commonly used clamps at this time is shown in the patent to Tipton, No. 2,846,968. This type of clamp is particularly useful when laying new lines on the ground.

However, there are two specific areas where a much heavier and different type of clamp is needed. In the offshore drilling industry, it is necessary that two sections of pipe be welded together while one or both are subject to severe movement, such as one end resting on the ocean floor, or a drilling platform, and the other end resting on a floating barge, or other vessel. Under this situation, it is readily seen that as the waves change the position of the vessel, tremendous strains are imposed on the holding fixtures.

At the present time in the offshore drilling art, the pipes to be joined are laid upon the deck of a large barge, and held down and properly spaced by means of chains and cables. However, as the line is being completed, one end is necessarily extended from the barge and often lies on pontoons which gently taper the pipe to the ocean bottom. Since the construction vessel is usually a floating barge, the waves necessarily move one pipe end with respect to another. It is not unusual for welders to spend as long as 12 hours attempting to complete a single stringer bead at a pipe joint under these circumstances.

The present invention is directed to a line up clamp which has as its object the proper securing alignment and adjustment of the ends of two pieces of pipe to be welded for particular use at offshore construction sites.

On the land, the size of transmission lines has steadily increased, until it is not unusual now to encounter pipelines in excess of three feet in diameter. With such large diameter pipe involved, it becomes increasingly hard to properly align and space the pipe so that the stringer bead may be implaced. Even more difficult, however, is the task of aligning a new section of pipeline with a section which is already in place, such as might be encountered when changing the piping arrangement at a pumping station because of residual strains. Under these circumstances, and particularly with large diameter pipes, the conventional line up clamps heretofore used are inadequate.

The present invention is directed toward a line up clamp which is particularly suited for use with large diameter pipe, and which allows adjustments to be made for coaxial alignment, as well as proper spacing between the butted ends for implacement of the stringer bead.

Another object of the present invention is to provide a line up clamp which may be broke ndown into easily portable parts.

Still further objects of the present invention is to provide a line up clamp which is capable of use with pipeline of various diameters.

A still further object of the present invention is to provide a line up clamp which is of relatively simple and sturdy construction, and easily understood by a welder, as well as being sufficiently open so as not to hamper the welding process which the clamp is designed to aid.

Other and further objects, features and advantages will be apparent from the following description of a presently preferred embodiment of the invention, given for the purpose of disclosure, taken in conjunction with the accompanying drawings, where like character references designate like parts throughout the several views, and where:

FIGURE 1 is a side view of the present invention showing it attached to appropriate sections of pipeline, FIGURE 2 is a sectional end view, taken along the line 2—2 of FIGURE 1, FIGURE 3 is a view similar to FIGURE 2, showing the clamp opened, and FIGURE 4 is a perspective view of a bushing suitable for use with the present invention when it is desired to clamp smaller diameter pipelines.

Generally, the present invention comprises a pair of yokes or clamps pivotally mounted on either end of a hinge bar, and including further guide bars supporting the two yokes with alignment and adjustment means interposed between the two yokes.

Referring now to the drawings, and particularly to FIGURE 1, the reference numeral 10 generally refers to the line up clamp of the present invention which is shown holding two sections of pipe 12 and 14. The butting ends of the pipes 12 and 14 have been suitably beveled, as it 16, and are spaced apart a distance $d$ which typically varies from $\frac{1}{16}$–$\frac{1}{8}$ inch for the proper implacement of a stringer weld bead.

It must be particularly emphasized that the proper spacing of the two sections of pipe 12 and 14 is of extreme importance. If the two sections of pipe move relative to each other as the stringer weld bead is implaced, then all of the efforts to that time have been in vain, for the weld must be broken and the pipe rebeveled so that the process can be begun again. Otherwise, a joint without the proper strength will result. The present invention is particularly designed to hold the pipes 12 and 14 in the proper relationship so that the stringer bead may be made with the minimum of difficulty.

With further reference now to FIGURE 1, the line up clamp 10 generally includes a pair of yokes 18 and 20 clamped about the pipe sections 12 and 14, respectively, the yokes in turn being aligned and slidably mounted on the alignment bars 22 with the adjustment means 24 interposed therebetween.

Both yokes 18 and 20 generally include a pair of semi-cylindrical jaws 26. As can be seen in FIGURE 2, each of the jaws 26 has an arm 28 extending therefrom, the extended ends of the arms 28 forming a hinge 30 about the hinge bar 22'.

Thus, as seen when comparing FIGURES 2 and 3, the jaws 26 may be swung apart by pivoting about the hinge bar 22' so that the clamp or yoke 18 or 20 may be engaged with the desired pipe section. Thereupon, the jaws 26 are closed and clamped about the pipe section with appropriate clamping means 32, here shown as a series of nuts and bolts.

Also extending from the jaws 26 are additional arms 34 which terminate in journals 36. The journals 36 enclose the alignment bars 22, which are slidably mounted therein. Each of the journals 36 and the hinge 30 may be appropriately lined with the bearing material, such as the bushing 38 which will allow the yoke to be slid relative to the bars 22. The hinge bar 22' is identical in all respects to the alignment bars 22 and in addition to serving to align yoke 20 with yoke 18, the hinge bar 22' serves as the pivot point for the hinges 30. At the extremity of each bar 22 is a cap 40, seen in FIGURE 1, whose function is to prevent the yoke from being inadvertently separated from the bars 22. The cap 40 may be appropriately fastened to the alignment bar 22 in any conventional manner, such as by the set screw 42.

Interconnecting the yokes 18 and 20 are the adjustment means 24, whose functions are to adjust the distance $d$ between the butted sections of pipe 12 and 14, and to insure the coaxial alignment of these two sections of pipe. The adjustment means are here shown as conventional steamboat ratchets which have been used for marine rigging for over ninety years. The typical steamboat ratchet comprises nothing more than a large turnbuckle which may be operated in either direction by means of a lever and ratchet arrangement. Any other conventional device capable of positive displacement may be used. It is to be particularly noted that the adjustment means interconnect the two yokes at each journal 36 and hinge 30, and that the adjustment means are generally parallel to the alignment bars 22. Thus, it is now apparent that upon proper manipulation of the adjustment means 24, the yokes 18 and 20 may be spaced relative to one another, while obtaining coaxial alignment of the closed jaws. Minor axial adjustments may be made by applying tension or compression along each bar 22.

Referring again to FIGURES 2 and 3, it will be noted that when the clamping means 32 are removed, one jaw 26 may be pivoted about the hinge 30 with respect to the other two open the yoke so as to release or encompass a section of pipe. To prevent the jaws from pivoting to too great an extent, and thus being unmanageable, a limit stop 44 is secured to the hinge 30. The limit stop 44 generally comprises two abutment members 46 and 48 appropriately fastened, as by welding, to the two arms 28 making up the hinge 30.

As clearly shown in FIGURE 1, also mounted at each hinge 30 is an eye 50, appropriately angled so that the line up clamp 10 may be manipulated by a crane, or other material handling device. Also shown in FIGURE 1 is a grease fitting 52 which extends through the bushing 38 so that the alignment bar 22 may be lubricated.

The length of the jaws 26 has a very important bearing on the efficient use of this clamp 10. If the jaws were short, the pipe would not be grasped well enough to prevent skewing. Therefore it is preferred that the length of the jaws be at least twice the diameter of the pipe being held, thus insuring rigidity of alignment during flexure.

In order to more securely grasp the sections of pipe, each jaw may be lined with a liner 54, best seen in FIGURES 2 and 3. The function of the liner 54 is to securely grip the pipe section to prevent slipping and galling, and for this purpose might be constructed of rubber or a fibrous material. A liner 54 may be attached to the inside of the semi-cylindrical jaw in any appropriate manner, such as by screws or an adhesive.

In order to extend the range of the present device beyond that of a particular diameter of pipe, reference is now made to FIGURE 4 which shows a split bushing or shoe for use with the present invention. The shoe 56 generally forms a right circular cylinder which has been split axially, the outer diameter of each portion fitting the inner diameter of the jaws 26 with provision for attachment thereto. Thus, each half of the shoe 56 may be attached to the jaw 26 by aligning the holes 60 in the shoe 56 with the holes 62 (seen in FIGURE 1) in the jaw 26; through which aligned holes 60 and 62 any conventional fastening means may be inserted, such as the nut and bolt 64. It is now apparent that the inside diameter of the shoe 56 may be appropriately lined as were the jaws 26 with the liner 54 and it is further apparent that a number of shoes 56 of differing inside diameters may be provided so that the line up clamp 10 is capable of securing a great number of pipes of various diameters.

In use, the clamping means 32 are removed, and the jaws 26 pivoted open so that the yokes 18 and 20 may be clamped upon the pipe sections 12 and 14. If the diameter of the pipe sections is smaller than the jaws 26, then the appropriate shoes 56 may be attached to the inside of the jaws 26. Thereupon the jaws 26 are pivoted about the hinge 30 and clamped together upon the pipe sections by the clamping means 32, thus securing the yokes to the two sections of pipe.

At that time, each of the adjustment means 24 may be manipulated so as to provide the proper distance $d$ between the abutted ends for the stringer bead. Further, the adjustment means 24 may be manipulated, either to push or to pull, so that the pipe sections 12 and 14 are coaxially aligned. For this purpose, it is necessary that the alignment means be capable of positive displacement, i.e. not only pulling the yokes 18 and 20 together, but also pushing them apart, and it may be found necessary to push on one of the alignment means 24 while pulling on the others.

After the alignment and proper distance $d$ has been secured, a welder may now proceed to implace the stringer weld bead about the beveled ends 16 of the pipes 12 and 14, and immediately thereafter proceed to fill in the beveled portion with weld metal, all in a conventional manner. After the two sections of pipe have been appropriately joined, then the line up clamp 10 of the present invention may be simply removed by removing the clamping means 32 and pivoting the jaws 26 apart, and then picking the clamp up by the eyes 50. Thereupon, the line up clamp 10 may be moved to another location for another similar job.

When it is desired to move the line up clamp 10 from one general locality to another, it may be found desirable to break the component parts into smaller pieces for easier manipulation. This is easily accomplished by removing the end cap 40 via the attachment means 42, and sliding the alignment bars 22 from the bushings 38, thus separating the line up clamp 10 into several pieces. Further, the adjustment means 24 may be disconnected and the yokes 18 and 20 separated into two parts by removing the clamping means 32 after the hinge bar 22' is removed. Thus, it is seen that the present invention advantageously provides an easily portable line up clamp for particular use with large diameter pipe.

Attention is also directed to the fact that in the area of the stringer bead or beveled ends 16, there are no members upon which a workman may be snagged or impeded. Thus, each of the alignment bars 22 has been set at a radial distance from the jaws 26 so as to allow the welder sufficient working room. Furthermore, if the pipe ends have been somewhat damaged, it may be necessary to insure the roundness thereof as the stringer bead is applied, and this may be done by utilizing the Tipton clamp, previously mentioned. The present invention has allowed sufficient room for this and other similar additional manipulative devices.

Thus, it is seen that the present invention has provided a line up clamp which is particularly suited for use with large diameter pipe in securing the coaxial alignment thereof, as well as the proper spacing distance $d$ for the placement of a stringer bead, even under adverse conditions.

The present invention, therefore, is well suited and adapted to carry out the objects and attain the ends and advantages mentioned, as well as others inherent therein. While a presently preferred embodiment of the invention has been given for the purpose of disclosure, numerous changes in the details of construction and combination, shape, size, arrangement of parts, and uses may be resorted to without departing from the spirit and scope of the invention as hereinafter claimed.

What is claimed is:

1. A line up clamp for axially aligning and spacing two sections of pipe including:
   first and second pipe engaging yokes,
   each yoke including a pair of pivotally mounted semi-cylindrical jaws,
   clamping means engageable with the jaws to secure the jaws to the pipes,
   the length of each jaw being at least twice the diameter of the pipe,
   three alignment bars interconnecting and maintaining the yokes in substantial coaxial alignment,
   each alignment bar slideably journaled in an arm extending radially from the pipe,
   one alignment bar pivotally mounting the jaws, and
   three positive displacement screw connectors interconnecting the yokes adjacent each alignment bar.

2. The invention of claim 1 including:
   axially split cylindrical shoes attachable within each pair of jaws whereby the clamp may be used with smaller diameter piper.

3. The invention of claim 1 including:
   a friction liner wtihin each jaw, and
   abutments mounted on the jaws to limit pivotal movement thereof.

4. The invention of claim 3 including:
   end caps mounted on each end of each alignment bar.

References Cited by the Examiner
UNITED STATES PATENTS

| | | | |
|---|---|---|---|
| 1,775,311 | 9/1930 | Halle | 228—4 |
| 2,167,887 | 8/1939 | Graham et al. | 269—189 X |
| 2,376,765 | 5/1945 | Forbes | 228—5 |
| 2,846,968 | 8/1958 | Tipton | 269—201 |
| 2,887,918 | 5/1959 | Benson | 269—270 X |
| 2,960,597 | 11/1960 | Bruno et al. | 219—60 X |

JOHN F. CAMPBELL, *Primary Examiner.*

THOMAS H. EAGER, *Examiner.*